United States Patent
Youn et al.

(10) Patent No.: US 10,876,046 B2
(45) Date of Patent: *Dec. 29, 2020

(54) CURABLE COMPOSITION INCLUDING QUANTUM DOT, RESIN LAYER USING THE SAME AND DISPLAY DEVICE

(71) Applicant: Samsung SDI Co., Ltd., Yongin-si (KR)

(72) Inventors: Jinsuop Youn, Suwon-si (KR); Minjee Park, Suwon-si (KR); Youn Je Ryu, Suwon-si (KR); Bumjin Lee, Suwon-si (KR); Jiyoung Jeong, Suwon-si (KR); Jong Kyu Choi, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 90 days.

This patent is subject to a terminal disclaimer.

(21) Appl. No.: 16/209,782

(22) Filed: Dec. 4, 2018

(65) Prior Publication Data

US 2020/0002604 A1    Jan. 2, 2020

(30) Foreign Application Priority Data

Jul. 2, 2018    (KR) .................. 10-2018-0076671

(51) Int. Cl.
    *C09K 11/02*    (2006.01)
    *C09K 11/70*    (2006.01)
    (Continued)

(52) U.S. Cl.
    CPC ............ *C09K 11/02* (2013.01); *C09K 11/565* (2013.01); *C09K 11/70* (2013.01); *C09K 11/883* (2013.01);
    (Continued)

(58) Field of Classification Search
    CPC ..... C09K 11/02; C09K 11/565; C09K 11/883; C09K 11/70; C09K 2323/03;
    (Continued)

(56) References Cited

U.S. PATENT DOCUMENTS

| 6,458,908 B1 | 10/2002 | Imai et al. |
| 2017/0052444 A1 | 2/2017 | Park et al. |

(Continued)

FOREIGN PATENT DOCUMENTS

| JP | 2008-249987 A | 10/2008 |
| JP | 2012-531619 A | 12/2012 |

(Continued)

OTHER PUBLICATIONS

Taiwanese Patent Search Report for corresponding Taiwanese Patent Application No. 107145563, dated Aug. 14, 2019, which was attached to the Taiwanese Patent Office Action dated Aug. 15, 2019, 4 pages.

(Continued)

*Primary Examiner* — Eli D. Strah
(74) *Attorney, Agent, or Firm* — Lewis Roca Rothgerber Christie LLP

(57) ABSTRACT

A curable composition includes: (A) a quantum dot; (B) a binder resin including a structural unit represented by Chemical Formula 1-1, a structural unit represented by Chemical Formula 1-2, a structural unit represented by Chemical Formula 1-3, and a structural unit represented by Chemical Formula 2; and (C) a solvent. A resin layer is manufactured using the curable composition, and a display device includes the resin layer.

21 Claims, 1 Drawing Sheet

(51) Int. Cl.
*C09K 11/88* (2006.01)
*C09K 11/56* (2006.01)
*F21V 8/00* (2006.01)
*G02F 1/1335* (2006.01)
*G02F 1/13357* (2006.01)

(52) U.S. Cl.
CPC .......... *G02B 6/005* (2013.01); *G02F 1/1336* (2013.01); *G02F 1/133514* (2013.01); *B32B 2457/202* (2013.01); *C09K 2323/03* (2020.08); *C09K 2323/05* (2020.08); *G02F 2001/133519* (2013.01); *G02F 2001/133614* (2013.01); *G02F 2202/102* (2013.01); *G02F 2202/107* (2013.01); *G02F 2202/108* (2013.01)

(58) Field of Classification Search
CPC ............... C09K 2323/05; G02F 1/1336; G02F 1/133514; G02F 1/133617; G02F 2202/102; G02F 2202/107; G02F 2202/108; G02F 2001/133519; G02F 2001/133614; G02B 6/005; Y10T 428/1036; Y10T 428/1059; B32B 2457/202; C08F 265/00; C08F 283/10; C08K 3/22; C08K 2003/2241
See application file for complete search history.

(56) References Cited

U.S. PATENT DOCUMENTS

| | | | |
|---|---|---|---|
| 2017/0059988 A1 | 3/2017 | Paek et al. | |
| 2017/0183565 A1 | 6/2017 | Jun et al. | |
| 2019/0243242 A1* | 8/2019 | Paek | G03F 7/0042 |
| 2019/0278173 A1* | 9/2019 | Kim | G03F 7/0043 |
| 2019/0278177 A1* | 9/2019 | Jeong | G02B 5/22 |
| 2020/0079649 A1 | 3/2020 | Miyanaga et al. | |

FOREIGN PATENT DOCUMENTS

| | | | | |
|---|---|---|---|---|
| JP | 2013-238837 A | 11/2013 | | |
| KR | 1992-7002502 A | 9/1992 | | |
| KR | 1994-0005617 B1 | 6/1994 | | |
| KR | 1995-7000359 A | 1/1995 | | |
| KR | 1995-0011163 B1 | 9/1995 | | |
| KR | 10-2014-0130216 A | 11/2014 | | |
| KR | 10-2016-0058632 A | 5/2016 | | |
| KR | 10-2016-0114362 A | 10/2016 | | |
| KR | 10-1712683 B1 | 3/2017 | | |
| KR | 10-2017-0040551 A | 4/2017 | | |
| KR | 10-2017-0071757 A | 6/2017 | | |
| KR | 10-1751646 B1 | 7/2017 | | |
| KR | 10-2017-0106048 A | 9/2017 | | |
| KR | 10-2017-0106056 A | 9/2017 | | |
| KR | 10-2017-0106791 A | 9/2017 | | |
| KR | 10-2018-0029744 A | 3/2018 | | |
| KR | 10-2018-0045395 A | 5/2018 | | |
| KR | 10-2018-0067243 A | 6/2018 | | |
| TW | 201730671 A | 9/2017 | | |
| TW | 201821457 A | 6/2018 | | |
| WO | WO 2017/092650 A1 | 6/2017 | | |
| WO | WO-2017146336 A1 * | 8/2017 | ........... | G03F 7/0007 |
| WO | WO-2018080008 A1 * | 5/2018 | ............. | G02B 5/206 |
| WO | WO-2018110864 A1 * | 6/2018 | ............. | G03F 7/032 |

OTHER PUBLICATIONS

Notice of Allowance issued in U.S. Appl. No. 16/190,739 by the USPTO, dated Jun. 17, 2020, 10 pages.
Taiwanese Patent Office Search Report with English Translation for corresponding Taiwanese Patent Application No. 107139455 dated Jul. 15, 2019 which was attached to the Notice of Allowance dated Jul. 19, 2019, 2 pages.
U.S. Notice of Allowance dated Sep. 8, 2020, issued in U.S. Appl. No. 16/190,739 (5 pages).
Korean Notice of Allowance dated Aug. 3, 2020, for corresponding Korean Patent Application No. 10-2018-0076671 (6 pages).

* cited by examiner

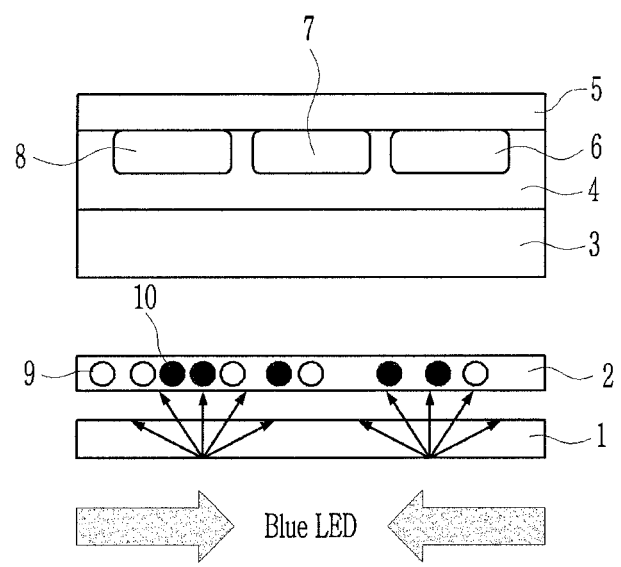

CURABLE COMPOSITION INCLUDING QUANTUM DOT, RESIN LAYER USING THE SAME AND DISPLAY DEVICE

CROSS-REFERENCE TO RELATED APPLICATION

This application claims priority to and the benefit of Korean Patent Application No. 10-2018-0076671 filed in the Korean Intellectual Property Office on Jul. 2, 2018, the entire contents of which are incorporated herein by reference.

BACKGROUND

1. Field

Embodiments of this disclosure relate to a curable composition including a quantum dot, a resin layer using the same, and a display device including the resin layer.

2. Description of the Related Art

Color filters are used for liquid crystal displays (LCD), optical filters for cameras, and the like. Color filters may be manufactured by coating a fine region with three or more colors on a charge-coupled device or a transparent substrate. This colored thin film may be manufactured utilizing a method of dying, printing, pigment dispersion, inkjet printing, and the like.

The dying involves forming a colored film by forming an image with a dying agent such as a natural photosensitive resin such as gelatin and/or the like, an amine-modified polyvinyl alcohol, an amine-modified acryl-based resin, and/or the like on a substrate, and then dying the image with direct dyes. In a dying process, generally-used dye and resin themselves have clearance and good dispersion, but light resistance, water resistance, and heat resistance may be reduced.

The printing involves forming a colored thin film by printing an ink prepared by dispersing a pigment in a thermally-curable or photocurable resin and curing it with heat or light. This method may decrease material cost as compared with other methods, but has difficulty in forming a fine and exact image.

The pigment dispersion method involves forming a colored film by repeating a series of processes such as coating, exposing to light, developing, and curing a photopolymerizable composition including a coloring agent on a transparent substrate with a black matrix. This pigment dispersion method can improve heat resistance and durability of a color filter and uniformly (e.g., substantially uniformly) maintain thickness of the film. In addition, it is widely used since it is not only easy to apply but can provide a fine pattern. For example, Korean Patent Laid-open No. 1992-7002502, Korean Patent Laid-open No. 1994-0005617, Korean Patent Laid-open No. 1995-0011163, Korean Patent Laid-open No. 1995-7000359, and the like disclose a method of manufacturing a coloring photosensitive resin composition using the pigment dispersion method.

However, this pigment dispersion method has difficulty in terms of managing a yield, since each color of red (R), green (G), and blue (B) respectively requires coating, exposure, development, and curing to form a pixel, which makes the whole process line longer and increases control factors among the processes.

Accordingly, this existing pigment dispersion method has recently been replaced with several new methods. An inkjet printing method is representatively included therein. The inkjet printing method involves forming a light proof layer such as a black matrix and/or the like on a glass substrate, and implanting ink in a pixel space. This inkjet printing method does not require a process such as coating, exposure, development, and the like, and can thereby decrease the amount of materials required for the processes and simplify the whole process line.

When a color filter is manufactured using such an inkjet ink, it is usual for at least two pigments to be mixed so as to ensure desired or required color characteristics. In some embodiments, when the red filter is manufactured, the main pigment includes a diketopyrolopyrol-based red pigment such as C.I. pigment red No. 254. In addition, as an auxiliary pigment, an anthraquinone-based red pigment, for example, C.I. Pigment Red 177 may be added or isoindolinone-based yellow pigment, for example C.I. Pigment Yellow 139 may be added. As needed or desired, other yellow and orange pigments, for example C.I. Pigment Yellow 138, C.I Pigment Yellow 150, C.I. Pigment Orange 38, and/or the like may be added. The pigments are generally used as a color filter material because of their excellent color characteristics, light resistance, and heat resistance; however, the desired or required physical properties become higher as the application fields of the LCD color filter are increased. Accordingly, in order to improve the color characteristics such as the brightness and the color purity when transmitting, research on pulverizing and fine-dispersing the pigments have progressed, but expression of the color characteristics of color filters by only combining these pigments is limited.

SUMMARY

An embodiment of the present disclosure provides a curable composition including a quantum dot capable of minimizing or reducing curing shrinkage rate during a thermal process and improving luminance.

Another embodiment provides a resin layer manufactured using the curable composition.

Another embodiment provides a display device including the resin layer.

An embodiment provides a curable composition including (A) a quantum dot; (B) a binder resin including a structural unit represented by Chemical Formula 1-1, a structural unit represented by Chemical Formula 1-2, a structural unit represented by Chemical Formula 1-3, and a structural unit represented by Chemical Formula 2 at the terminal end; and (C) a solvent.

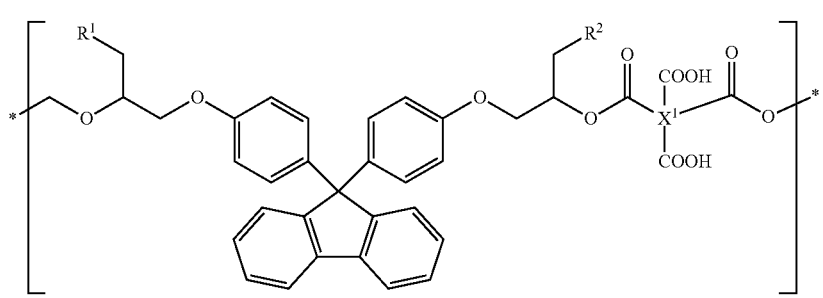

Chemical Formula 1-1

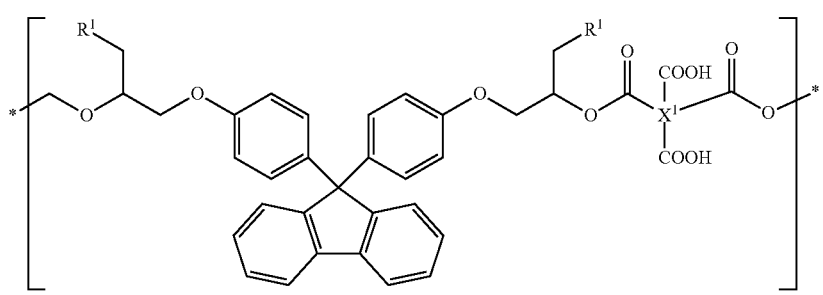

Chemical Formula 1-2

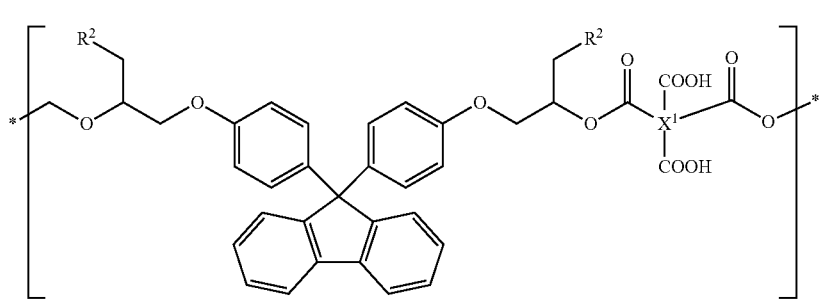

Cemical Formula 1-3

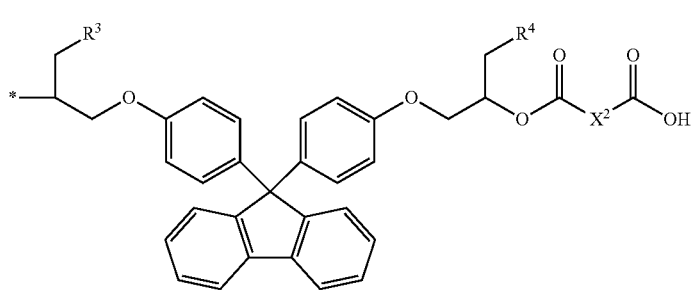

Chemical Formula 2

In Chemical Formula 1-1, Chemical Formula 1-2, Chemical Formula 1-3, and Chemical Formula 2, $R^1$ is a substituted or unsubstituted acrylate group, $R^2$ is a substituted or unsubstituted C6 to C20 thioaryl group, $R^3$ and $R^4$ are independently a substituted or unsubstituted acrylate group or a substituted or unsubstituted C6 to C20 thioaryl group, $X^1$ is a substituted or unsubstituted quadrivalent organic group, and $X^2$ is a substituted or unsubstituted divalent organic group.

The acrylate group may be represented by Chemical Formula 3.

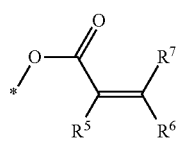

Chemical Formula 3

In Chemical Formula 3, $R^5$ to $R^7$ are independently a hydrogen atom or a substituted or unsubstituted C1 to C20 alkyl group.

The binder resin may satisfy Equation 1.

$$0.1 \leq a/a+b \leq 0.5 \quad \text{Equation 1}$$

In Equation 1, a denotes the number of the acrylate group in the binder resin, and b denotes the number of the thioaryl group in the binder resin.

The curable composition may further include another binder resin including a structural unit represented by Chemical Formula 1-3 and a structural unit represented by Chemical Formula 2 at both terminal ends.

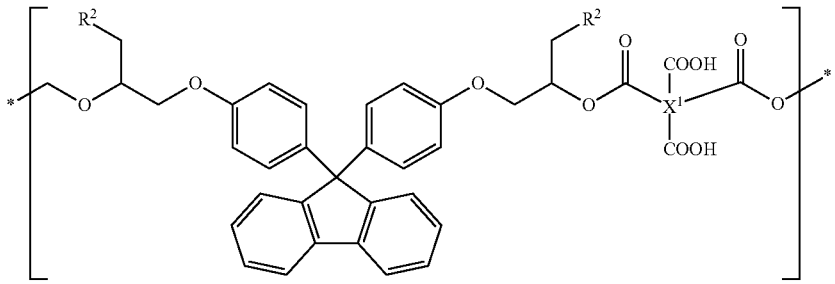

Chemical Formula 1-3

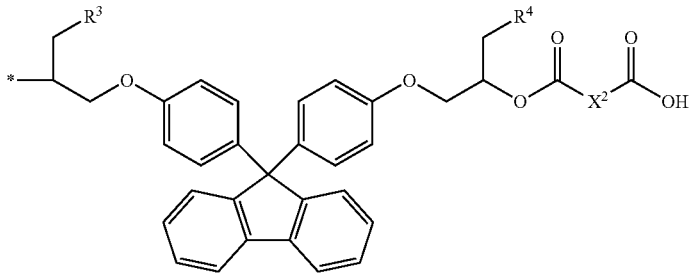

Chemical Formula 2

In Chemical Formula 1-3 and Chemical Formula 2, $R^2$ to $R^4$ are independently a substituted or unsubstituted C6 to C20 thioaryl group, $X^1$ is a substituted or unsubstituted quadrivalent organic group, and $X^2$ is a substituted or unsubstituted divalent organic group.

$X^1$ may be represented by one of Chemical Formula X-1 to Chemical Formula X-3.

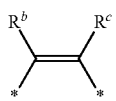

Chemical Formula X-1

Chemical Formula X-2

Chemical Formula X-3

In Chemical Formula X-1, $L^1$ is a single bond, an oxygen atom, a sulfur atom, *—C(=O)—*, or *—$CR^{a1}R^{a2}$—* (wherein $R^{a1}$ and $R^{a2}$ are independently a halogen-substituted or unsubstituted C1 to C10 alkyl group).

$X^2$ may be represented by one of Chemical Formula X-4 to Chemical Formula X-10.

Chemical Formula X-4

In Chemical Formula X-4, $R^b$ and $R^c$ are independently a hydrogen atom, a substituted or unsubstituted C1 to C20 alkyl group, an ester group, or an ether group.

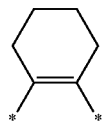

Chemical Formula X-5

Chemical Formula X-6

Chemical Formula X-7

-continued

Chemical Formula X-8

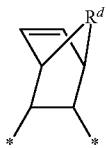

In Chemical Formula X-8, $R^d$ is O, S, NH, a substituted or unsubstituted C1 to C20 alkylene group, a C1 to C20 alkylamine group, or a C2 to C20 alkenylamine group.

Chemical Formula X-9

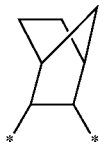

Chemical Formula X-10

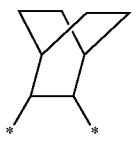

The binder resin may have a weight average molecular weight of about 2,000 g/mol to about 12,000 g/mol.

The quantum dot may be a quantum dot that absorbs light at a wavelength of about 360 nm to about 780 nm and emits fluorescence at a wavelength of about 500 nm to about 700 nm.

The quantum dot may include a green quantum dot and a red quantum dot.

The solvent may include propylene glycol monomethylether acetate, dipropylene glycol methylether acetate, cyclohexyl acetate, ethanol, ethylene glycoldimethylether, ethylene diglycolmethylethylether, diethylene glycoldimethylether, dimethyl acetamide, 2-butoxyethanol, N-methylpyrrolidine, N-ethylpyrrolidine, propylene carbonate, γ-butyrolactone, or a combination thereof.

The curable composition may further include a reactive unsaturated compound.

The curable composition may further include a diffusion agent.

The diffusion agent may be included in an amount of about 0.1 wt % to about 20 wt % based on the total amount (weight) of the curable composition.

The diffusion agent may include barium sulfate, calcium carbonate, titanium dioxide, zirconia, or a combination thereof.

The curable composition may further include a thiol-based additive.

The thiol-based additive may include at least two functional groups represented by Chemical Formula 4 at a terminal end.

Chemical Formula 4

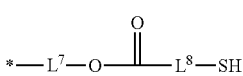

In Chemical Formula 4, $L^7$ and $L^8$ are independently a single bond, a substituted or unsubstituted C1 to C20 alkylene group, a substituted or unsubstituted C3 to C20 cycloalkylene group, a substituted or unsubstituted C6 to C20 arylene group, or a substituted or unsubstituted C2 to C20 heteroarylene group.

The curable composition may include about 1 wt % to about 40 wt % of the quantum dot, about 1 wt % to about 40 wt % of the binder resin, and a balance amount of the solvent based on the total amount (weight) of the curable composition.

The curable composition may further include malonic acid; 3-amino-1,2-propanediol; a silane-based coupling agent; a leveling agent; a fluorine-based surfactant; or a combination thereof.

Another embodiment provides a resin layer manufactured using the curable composition.

Another embodiment provides a display device including the resin layer.

The display device further includes a color filter and a liquid crystal layer, and herein, the color filter may be disposed at one side of the liquid crystal layer, while the resin layer may be disposed at the other side of the liquid crystal layer.

Other embodiments of the present disclosure are included in the following detailed description.

An existing acryl-based binder resin or epoxy-based binder resin has a high curing shrinkage rate during the thermal process and thus causes a surface omission or generates a crack when a thermally curable composition including the same is formed into a cured layer (a resin layer), but a curable composition according to an embodiment of the present disclosure uses a binder resin having a different structure from that of existing binder resins and minimizes or reduces the curing shrinkage rate during the thermal process, and thus, may prevent surface omission or cracking (or reduce a likelihood of surface omission and/or cracking) and, in addition, may improve quantum efficiency and dispersion of quantum dots, and thus, luminance.

BRIEF DESCRIPTION OF THE DRAWING

The accompanying drawing, together with the specification, illustrates an embodiment of the subject matter of the present disclosure, and, together with the description, serves to explain principles of embodiments of the subject matter of the present disclosure.

The accompanying drawing is a schematic view showing a display device (LCD) having a resin layer formed of a curable composition according to an embodiment.

DETAILED DESCRIPTION

Hereinafter, embodiments of the present disclosure are described in more detail. However, these embodiments are exemplary, the present disclosure is not limited thereto, and the scope of the present disclosure is defined by the scope of the appended claims and equivalents thereof.

As used herein, when a specific definition is not otherwise provided, the term "alkyl group" refers to a C1 to C20 alkyl group, the term "alkenyl group" refers to a C2 to C20 alkenyl group, the term "cycloalkenyl group" refers to a C3 to C20 cycloalkenyl group, the term "heterocycloalkenyl group" refers to a C3 to C20 heterocycloalkenyl group, the term "aryl group" refers to a C6 to C20 aryl group, the term "arylalkyl group" refers to a C6 to C20 arylalkyl group, the term "alkylene group" refers to a C1 to C20 alkylene group, the term "arylene group" refers to a C6 to C20 arylene group, the term "alkylarylene group" refers to a C6 to C20 alkylarylene group, the term "heteroarylene group" refers to a C3 to C20 heteroarylene group, and the term "alkoxylene group" refers to a C1 to C20 alkoxylene group.

As used herein, when a specific definition is not otherwise provided, the term "substituted" refers to replacement of at least one hydrogen by a substituent of a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

As used herein, when a specific definition is not otherwise provided, the term "hetero" refers to one substituted with at least one hetero atom of N, O, S and P, in a chemical formula.

As used herein, when a specific definition is not otherwise provided, the term "(meth)acrylate" refers to both "acrylate" and "methacrylate", and the term "(meth)acrylic acid" refers to "acrylic acid" and "methacrylic acid".

As used herein, when a specific definition is not otherwise provided, the term "combination" refers to mixing (or a mixture), a chemical combination (e.g., copolymerization, an alloy, or a chemical compound), or a laminated structure of components.

As used herein, unless a specific definition is otherwise provided, a hydrogen atom is bonded at the position when a chemical bond is not drawn where supposed to be given. For example, for purposes of clarity, certain hydrogen atoms may be omitted from the chemical formulae shown herein.

As used herein, when a specific definition is not otherwise provided, "*" indicates a point where the same or different atom or chemical formula is linked.

A curable composition according to an embodiment includes (A) a quantum dot; (B) a binder resin including a structural unit represented by Chemical Formula 1-1, a structural unit represented by Chemical Formula 1-2, and a structural unit represented by Chemical Formula 1-3, and including a structural unit represented by Chemical Formula 2; and (C) a solvent.

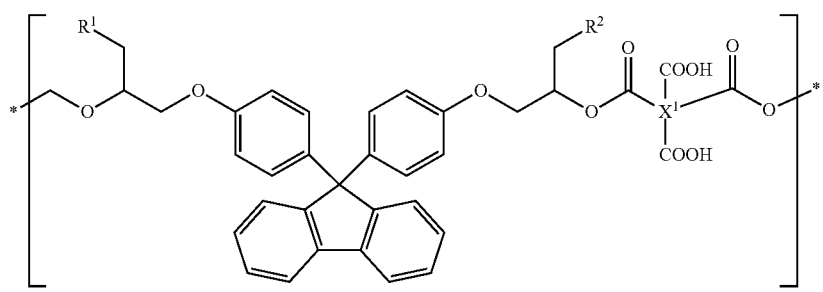

Chemical Formula 1-1

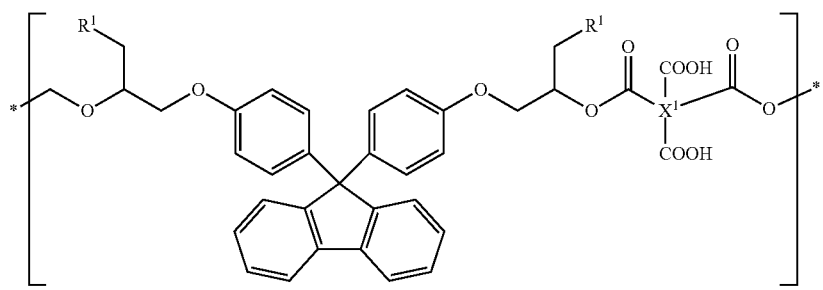

Chemical Formula 1-2

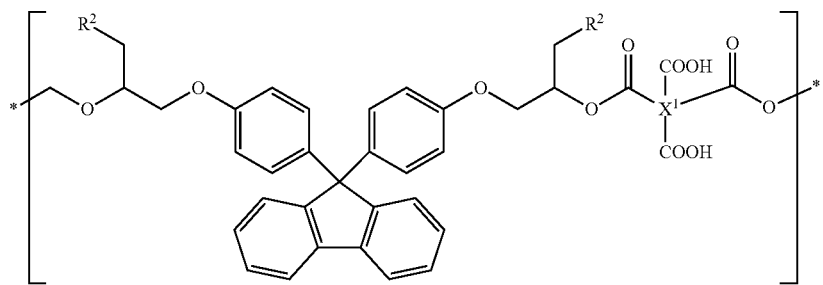

Cemical Formula 1-3

Chemical Formula 2

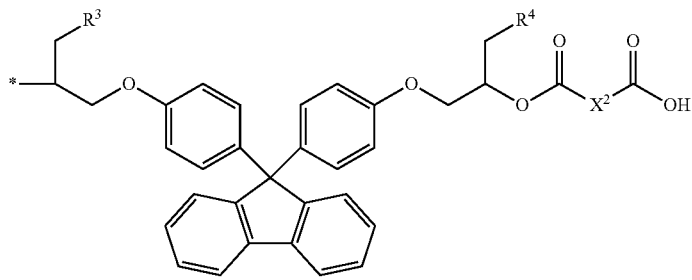

In Chemical Formula 1-1, Chemical Formula 1-2, Chemical Formula 1-3, and Chemical Formula 2, $R^1$ is a substituted or unsubstituted acrylate group, $R^2$ is a substituted or unsubstituted C6 to C20 thioaryl group, $R^3$ and $R^4$ are independently a substituted or unsubstituted acrylate group or a substituted or unsubstituted C6 to C20 thioaryl group, $X^1$ is a substituted or unsubstituted quadrivalent organic group, and $X^2$ is a substituted or unsubstituted divalent organic group.

An embodiment of the present disclosure relates to a curable composition including a quantum dot, for example, a thermally curable composition, which has recently been acknowledged as a new technological trend in a display field. The curable composition including a quantum dot, which is applied to a display, includes a binder resin, a colorant, a solvent, an additive, and/or the like, such as those used in existing curable compositions, and uses a quantum dot instead of a colorant such as a pigment/a dye as a material for realizing color characteristics and in addition, may further include a light diffusion agent and/or the like.

The quantum dot may be representatively CdSe, InP, and/or the like. A synthesis method of the quantum dot has been rapidly developed in terms of luminous efficiency (a quantum yield) and gets to realize luminous efficiency of near to 100%. For example, QD SUHD TV manufactured by applying a quantum dot sheet is currently commercially available. Furthermore, QD TV is being developed by including the quantum dot in a color resist layer of an existing LED TV (excluding a pigment and/or a dye) as a self-emitting version rather than a filtering version in the color resist layer. This development of TV by applying the quantum dot-containing resin composition depends (or critically depends) on maintaining patterning properties of the composition and photo efficiency of the quantum dot and well realizing the pattern properties in a process of a thermal process (prebaking)-exposure-development-washing-deposition-another thermal process (post-baking) and/or the like.

However, a method of including a quantum dot in a color resist layer of an existing LED TV to make a color resist layer self light-emit costs high and has a limit in minimizing or reducing a shrinkage rate during the thermal process, but recently, research on a method of inserting a quantum dot sheet as a separate layer without including a quantum dot-containing resin layer in the color resist layer, making blue light (a light source) incident into the quantum dot sheet, and converting the blue light into white light has been made. Herein, in order to convert blue light into white light, the quantum dot sheet should include both of a green quantum dot and a red quantum dot.

A quantum dot playing an important or essential function in the conversion of the blue light is surrounded with a hydrophobic ligand, and herein, when this hydrophobic quantum dot is added to a hydrophilic composition (e.g., and an epoxy-based binder resin-containing curable composition, etc.), there is a problem of dispersibility deterioration, and accordingly, in order to solve or reduce this dispersibility problem, research on ligand substitution and passivation on the surface of the quantum dot is actively being made. However, a patterning process of the curable composition including a quantum dot sharply deteriorates sensitivity, and thus, does not suitably or satisfactorily secure a patterning property.

In addition, since the curable composition including a quantum dot includes a large amount of inorganic particles, and thus, a relatively small amount of an organic material, processibility is deteriorated. Accordingly, a pattern in a forward direction is very difficult to form due to a melting characteristic deterioration of the pattern, particularly during post-baking process as well as developability deterioration.

An undercut of a photoresist has been improved by applying a binder resin having a low melting point, such as a cardo-based binder resin, to a composition to post-bake the undercut after development, or by introducing an epoxy group into the binder resin to reinforce a close-contacting force during the prebaking process. However, since a curable composition including a quantum dot includes a large amount of an inorganic material as aforementioned, the undercut is limitedly improved since the melting characteristics are not shown by only applying the cardo-based binder resin (a curable composition including a quantum dot includes a large amount of an inorganic material and thus shows no (or substantially no) melting characteristics after the post-baking), and the binder resin including the epoxy group has a problem of large residue characteristic deterioration. In addition, since the acryl-based binder resin is one reason of deteriorating quantum dot efficiency in the composition, existing acryl-based binder resins are themselves difficult to use.

Furthermore, an acryl-based binder resin or an epoxy-based binder resin previously used as a binder resin in a curable composition including a quantum dot shows a curing shrinkage rate in a range of about 15% to about 20% in the post-baking step during the thermal curing process, a curing shrinkage rate of about 5% in an additional thermal process step after the post-baking, and thus, has a problem of a surface omission in the resin layer and, even if no surface omission, a problem of causing a crack in the resin layer. As for the epoxy-based binder resin, the problem is caused by deterioration of quantum efficiency or dispersibility of the quantum dot due to an epoxy curing mechanism and an epoxy structure (as aforementioned, the surface of the quantum dot is hydrophobic, but a network formed by an epoxy structure is hydrophilic), and as for the acryl-based binder resin, the acryl-based binder resin has compatibility with the quantum dot, and thus no deterioration of quantum efficiency, but the problem is caused by too large of a free volume among molecules during the curing.

However, the curable composition including a quantum dot according to an embodiment of the present disclosure uses a cardo-based binder resin as a binder resin, and thus, solves or reduces the problem (the surface omission, the crack, and/or the like) by applying the cardo-based binder resin including a structural unit including both of the acrylate group and the thioaryl group as a functional group to minimize or reduce an intermolecular free volume due to π-π stacking of fluorene compounds, and thus, a shrinkage rate resulting from the curing.

Hereinafter, each component is described in more detail.

(A) Quantum Dot

The quantum dot may absorb light in a wavelength region of about 360 nm to about 780 nm, for example about 400 nm to about 780 nm, and emit fluorescence in a wavelength region of about 500 nm to about 700 nm, for example, about 500 nm to about 580 nm, or about 600 nm to about 680 nm. For example, the quantum dot may have a maximum fluorescence wavelength (fluorescence $\lambda_{em}$) of about 500 nm to about 680 nm.

The quantum dot may independently emit light having a wavelength range such that the light has a full width at half maximum (FWHM) in a range of about 20 nm to about 100 nm, for example, about 20 nm to about 50 nm. When the quantum dot has a full width at half maximum (FWHM) within the foregoing ranges, the quantum dot has high color purity, and thus, an effect of increasing or improving color reproducibility when used as a color material in a color filter.

The quantum dot may independently be an organic material, an inorganic material, or a hybrid (mixture) of the organic material and the inorganic material.

The quantum dot may independently include a core and a shell surrounding the core, and herein, the core and the shell may have a structure such as a core independently including a Group II-IV element, a Group III-V element, and/or the like, a core/a shell, a core/a first shell/a second shell, an alloy, an alloy/a shell, and/or the like, but are not limited thereto.

For example, the core may include at least one material selected from CdS, CdSe, CdTe, ZnS, ZnSe, ZnTe, HgS, HgSe, HgTe, GaN, GaP, GaAs, InP, InAs, and an alloy thereof, but is not necessarily limited thereto. The shell surrounding the core may include at least one material selected from CdSe, ZnSe, ZnS, ZnTe, CdTe, PbS, TiO, SrSe, HgSe, and an alloy thereof, but is not necessarily limited thereto.

In an embodiment, since an interest in protecting the environment has been recently much increased around world, and regulations of toxic materials also have been increased and/or fortified, a non-cadmium-based light emitting material (InP/ZnS) having little low quantum efficiency (quantum yield) but being environmentally-friendly instead of a light emitting material having a cadmium-based core is used but not necessarily limited thereto.

The structure of the quantum dot is not particularly limited, but in the case of the quantum dot of the core/shell structure may have an entire size (e.g., may have a total average particle diameter) including the shell (an average particle diameter) of about 1 nm to about 15 nm, for example, about 5 nm to about 15 nm.

For example, the quantum dot may include a red quantum dot, a green quantum dot, or a combination thereof. For example, the quantum dot may include both of the green quantum dot and the red quantum dot. Herein, the green quantum dot may be included in a larger amount than the red quantum dot. The red quantum dot may have an average particle diameter of about 10 nm to about 15 nm. The green quantum dot may have an average particle diameter of about 5 nm to about 8 nm.

On the other hand, for dispersion stability of the quantum dot, a curable composition according to an embodiment may further include a dispersing agent. The dispersing agent helps uniform (e.g., substantially uniform) dispersibility of a photo-conversion material such as a quantum dot in the curable composition and may include a non-ionic, anionic, or cationic dispersing agent. For example, the dispersing agent may be polyalkylene glycol or esters thereof, a polyoxy alkylene, a polyhydric alcohol ester alkylene oxide addition product, an alcohol alkylene oxide addition product, a sulfonate ester, a sulfonate salt, a carboxylate ester, a carboxylate salt, an alkyl amide alkylene oxide addition product, an alkyl amine, and the like, and they may be used alone or in a mixture of two or more. The dispersing agent may be used in an amount of about 0.1 wt % to about 100 wt %, for example about 10 wt % to about 20 wt % relative to a solid content of the photo-conversion material such as a quantum dot.

The quantum dot may be included in an amount of about 1 wt % to about 40 wt %, for example about 1 wt % to about 10 wt % based on the total amount (weight) of the curable composition according to an embodiment. When the quantum dot is included within the foregoing ranges, a photo-conversion rate is improved and excellent processibility may be provided by not decreasing pattern characteristics and development characteristics.

(B) Binder Resin

The binder resin includes the structural unit represented by Chemical Formula 1-1, the structural unit represented by Chemical Formula 1-2, the structural unit represented by Chemical Formula 1-3, and the structural unit represented by Chemical Formula 2. For example, the binder resin may include the structural unit represented by Chemical Formula 2 at the terminal end (or ends).

The binder resin structurally includes both of the vinyl group and the thioaryl group in the curable acrylate group, and thus, may solve or reduce the above undercut problem and concurrently (e.g., simultaneously) improve a development margin.

When the thioaryl group is not present in the structure of the binder resin, photo characteristics, for example, a photo maintenance rate is largely deteriorated, but when the acrylate group is not present in the binder resin, pattern property may be largely deteriorated due to generation of an undercut.

For example, the acrylate group may be represented by Chemical Formula 3.

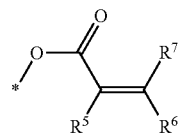

Chemical Formula 3

In Chemical Formula 3, $R^5$ to $R^7$ are independently a hydrogen atom or a substituted or unsubstituted C1 to C20 alkyl group.

For example, the vinyl group in the acrylate group is a curing site, and the acrylate group may be present in an amount of about 10% to about 50%, for example, about 20% to about 30% based on a total amount (100% of the weight) of the acrylate group and the thioaryl group in the binder resin. The acrylate group within the foregoing ranges may facilitate lower part curing during the UV curing, and thus, solve or reduce the undercut problem and also, promote pattern-forming capability.

For example, the binder resin may satisfy Equation 1.

$$0.1 \leq a/a+b \leq 0.5 \quad \text{Equation 1}$$

In Equation 1, a denotes the number of the acrylate group in the binder resin, and b denotes the number of the thioaryl group in the binder resin.

The curable composition may further include a binder resin (e.g., another binder resin) including a structural unit represented by Chemical Formula 1-3 and a structural unit represented by Chemical Formula 2 at both terminal ends of the binder resin.

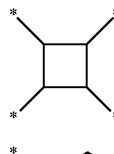
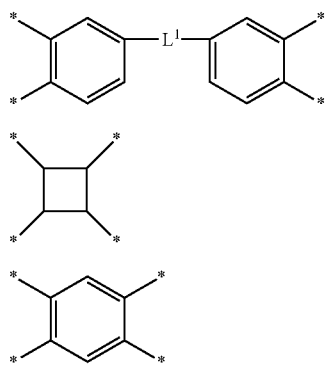

Chemical Formula X-1

Chemical Formula X-2

Chemical Formula X-3

In Chemical Formula X-1, $L^1$ is a single bond, an oxygen atom, a sulfur atom, *—C(=O)—*, or *—$CR^{a1}R^{a2}$—* (wherein $R^{a1}$ and $R^{a2}$ are independently a halogen-substituted or unsubstituted C1 to C10 alkyl group).

For example, in Chemical Formula X-1, $L^1$ may be a sulfur atom.

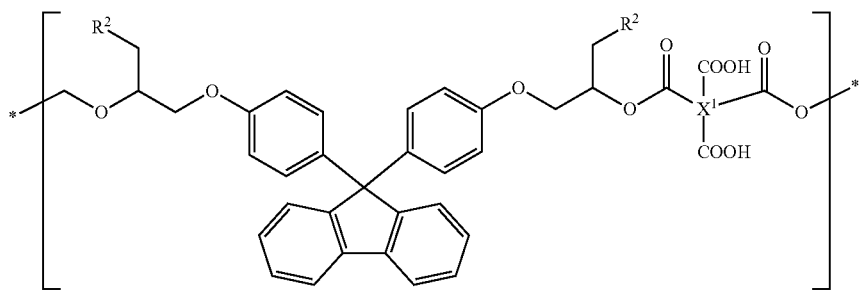

Chemical Formula 1-3

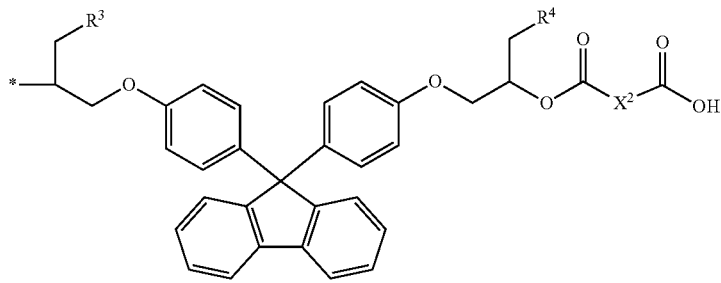

Chemical Formula 2

In Chemical Formula 1-3 and Chemical Formula 2, $R^2$ to $R^4$ are independently a substituted or unsubstituted C6 to C20 thioaryl group, $X^1$ is a substituted or unsubstituted quadrivalent organic group, and $X^2$ is a substituted or unsubstituted divalent organic group.

In Chemical Formula 1-1 to Chemical Formula 1-3, $X^1$ may be presented by one of Chemical Formula X-1 to Chemical Formula X-3.

In Chemical Formula 2, $X^2$ may be represented by one of Chemical Formula

X-4 to Chemical Formula X-10.

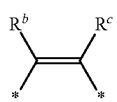

Chemical Formula X-4

In Chemical Formula X-4, $R^b$ and $R^c$ are independently a hydrogen atom, a substituted or unsubstituted C1 to C20 alkyl group, an ester group, or an ether group.

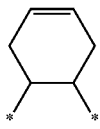
Chemical Formula X-5

Chemical Formula X-6

Chemical Formula X-7

Chemical Formula X-8

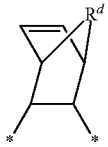

In Chemical Formula X-8, $R^d$ is O, S, NH, a substituted or unsubstituted C1 to C20 alkylene group, a C1 to C20 alkylamine group, or a C2 to C20 alkenylamine group.

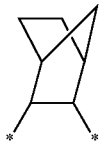
Chemical Formula X-9

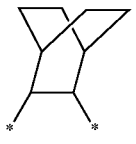
Chemical Formula X-10

The binder resin may have a weight average molecular weight of about 2,000 g/mol to about 12,000 g/mol. When the binder resin has a weight average molecular weight within the foregoing range, a pattern may be well formed without a residue, and in addition, the pattern may be suitable or satisfactory without a thickness loss during development. In some embodiments, when the binder resin has a weight average molecular weight of less than about 2,000 g/mol, a polymer is difficult or impossible to form, and when the binder resin has a weight average molecular weight of greater than about 12,000 g/mol, the binder resin is dissolved as a peel type (or kind) during the KOH development, and thus, generates impurities.

The binder resin may be included in an amount of about 1 wt % to about 40 wt %, for example, about 5 wt % to about 20 wt % based on the total amount (weight) of the curable composition. When the binder resin is included within the foregoing ranges, excellent sensitivity, developability, resolution, and linearity of a pattern may be obtained.

(C) Solvent

The curable composition according to an embodiment may include, as a solvent, alcohols such as methanol, ethanol, and/or the like; glycol ethers such as ethylene glycol methylether, ethylene glycol ethylether, propylene glycol methylether, and/or the like; cellosolve acetates such as methyl cellosolve acetate, ethyl cellosolve acetate, diethyl cellosolve acetate, and/or the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and/or the like; propylene glycol alkylether acetates such as propylene glycol monomethylether acetate, propylene glycol propylether acetate, and/or the like; ketones such as methylethylketone, cyclohexanone, 4-hydroxy-4-methyl-2-pentanone, methyl-n-propylketone, methyl-n-butylketone, methyl-n-amylketone, 2-heptanone, and/or the like; saturated aliphatic monocarboxylic acid alkyl esters such as ethyl acetate, n-butyl acetate, isobutyl acetate, and/or the like; lactate esters such as methyl lactate, ethyl lactate, and/or the like; hydroxy acetic acid alkyl esters such as methyl hydroxyacetate, ethyl hydroxyacetate, butyl hydroxyacetate, and/or the like; acetic acid alkoxyalkyl esters such as methoxymethyl acetate, methoxyethyl acetate, methoxybutyl acetate, ethoxymethyl acetate, ethoxyethyl acetate, and/or the like; 3-hydroxypropionic acid alkyl esters such as methyl 3-hydroxypropionate, ethyl 3-hydroxypropionate, and/or the like; 3-alkoxypropionic acid alkyl esters such as methyl 3-methoxypropionate, ethyl 3-methoxypropionate, ethyl 3-ethoxypropionate, methyl 3-ethoxypropionate, and/or the like; 2-hydroxypropionic acid alkyl ester such as methyl 2-hydroxypropionate, ethyl 2-hydroxypropionate, propyl 2-hydroxypropionate, and/or the like; 2-alkoxypropionic acid alkyl esters such as methyl 2-methoxypropionate, ethyl 2-methoxypropionate, ethyl 2-ethoxypropionate, methyl 2-ethoxypropionate, and/or the like; 2-hydroxy-2-methylpropionic acid alkyl esters such as methyl 2-hydroxy-2-methylpropionate, ethyl 2-hydroxy-2-methylpropionate, and/or the like; 2-alkoxy-2-methylpropionic acid alkyl esters such as methyl 2-methoxy-2-methylpropionate, ethyl 2-ethoxy-2-methylpropionate, and/or the like; esters such as 2-hydroxyethyl propionate, 2-hydroxy-2-methylethyl propionate, hydroxyethyl acetate, methyl 2-hydroxy-3-methylbutanoate, and/or the like; or ketonate esters such as ethyl pyruvate, and/or the like, and in addition, may be N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, phenyl cellosolve acetate, cyclohexyl acetate, and/or the like, but is not limited thereto.

For example, the solvent may be desirably glycol ethers such as ethylene glycol monoethylether, ethylene diglycolmethylethylether, and/or the like; ethylene glycol alkylether acetates such as ethyl cellosolve acetate, and/or the like; esters such as 2-hydroxy ethyl propionate, and/or the like; carbitols such as diethylene glycol monomethylether, and/or the like; propylene glycol alkylether acetates such as propylene glycol monomethylether acetate, propylene glycol propylether acetate, and/or the like; alcohols such as ethanol, and/or the like, cyclohexyl acetate, or a combination thereof.

For example, the solvent may be a polar solvent including propylene glycol monomethylether acetate, dipropylene glycol methylether acetate, cyclohexyl acetate, ethanol, ethylene glycoldimethylether, ethylene diglycolmethylethylether, diethylene glycoldimethylether, dimethyl acetamide, 2-butoxyethanol, N-methylpyrrolidine, N-ethylpyrrolidine, propylene carbonate, γ-butyrolactone, or a combination thereof.

The solvent may be included in a balance amount, for example about 20 wt % to about 80 wt %, for example about 35 wt % to about 80 wt % based on the total amount (weight) of the curable composition. When the solvent is within the foregoing ranges, the curable composition has suitable or appropriate viscosity and thus may have excellent coating property when coated in a large area through spin-coating and slit-coating.

Reactive Unsaturated Compound

The reactive unsaturated compound may be mixed with any suitable monomer or oligomer used in the art for a curable composition.

The reactive unsaturated compound may be an acrylate-based compound.

For example, it may be at least one selected form ethylene glycoldiacrylate, triethylene glycoldiacrylate, 1,4-butanedioldiacrylate, 1,6-hexanedioldiacrylate, neopentylglycoldiacrylate, pentaerythritoldiacrylate, pentaerythritoltriacrylate, dipentaerythritoldiacrylate, dipentaerythritoltriacrylate, dipentaerythritolpentaacrylate, pentaerythritolhexaacrylate, bisphenol A diacrylate, trimethylolpropanetriacrylate, novolacepoxyacrylate, ethylene glycoldimethacrylate, diethylene glycoldimethacrylate, triethylene glycoldimethacrylate, propylene glycoldimethacrylate, 1,4-butanedioldimethacrylate, 1,6-hexanedioldimethacrylate, and the like, which may be used alone or as a mixture of two or more.

The reactive unsaturated compound may be treated with acid anhydride to improve developability.

The reactive unsaturated compound may be included in an amount of about 1 wt % to about 10 wt %, for example about 1 wt % to about 5 wt % based on the total amount (weight) of the curable composition. When the reactive unsaturated compound is included within the foregoing ranges, the reactive unsaturated compound is suitably or sufficiently cured during exposure in a pattern-forming process, and thus, reliability is improved and heat resistance, light resistance, chemical resistance, resolution and/or a close contacting property of a pattern may be improved.

Diffusion Agent (or Diffusion Agent Dispersion)

The curable composition according to an embodiment may further include a diffusion agent.

For example, the diffusion agent may include barium sulfate ($BaSO_4$), calcium carbonate ($CaCO_3$), titanium dioxide ($TiO_2$), zirconia ($ZrO_2$), or a combination thereof.

The diffusion agent reflects light not absorbed in the above quantum dot, so that the reflected light may be adsorbed again in the quantum dot. In other words, the diffusion agent increases a dose of the light absorbed in the quantum dot and thus photo-conversion efficiency of the curable composition.

The diffusion agent may have an average particle diameter (e.g., $D_{50}$) of about 150 nm to about 250 nm, for example, about 180 nm to about 230 nm. When the diffusion agent has an average particle diameter within the foregoing ranges, much more excellent light scattering effects may be obtained, and photo-conversion efficiency may be increased.

The diffusion agent may be included in an amount of about 0.1 wt % to about 20 wt %, for example about 1 wt % to about 15 wt % based on a total solid amount (weight) of the curable composition. When the diffusion agent is included in an amount of less than about 0.1 wt % based on a total weight of the curable composition, improvement of photo-conversion efficiency may be difficult to obtain, while when the diffusion agent is included in an amount of greater than about 20 wt %, pattern characteristics may be deteriorated.

Other Additives

In order to improve stability and dispersibility of the quantum dot, the curable composition according to an embodiment may further include a thiol-based additive.

The thiol-based additive may replace the shell surface of the quantum dot, and may improve dispersion stability of a quantum dot in a solvent and may stabilize the quantum dot.

The thiol-based additive may have 2 to 10, for example 2 to 4 thiol groups (—SH) at the terminal end (or ends) according to its structure.

For example, the thiol-based additive may include at least two functional groups represented by Chemical Formula 4 at the terminal end (or ends). In some embodiments, the thiol-based additive includes one group represented by Chemical Formula 4 at each terminal end of the thiol-based additive.

Chemical Formula 4

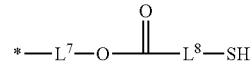

In Chemical Formula 4, $L^7$ and $L^8$ are independently a single bond, a substituted or unsubstituted C1 to C20 alkylene group, a substituted or unsubstituted C3 to C20 cycloalkylene group, a substituted or unsubstituted C6 to C20 arylene group, or a substituted or unsubstituted C2 to C20 heteroarylene group.

For example, the thiol-based additive may be represented by Chemical Formula 5.

Chemical Formula 5

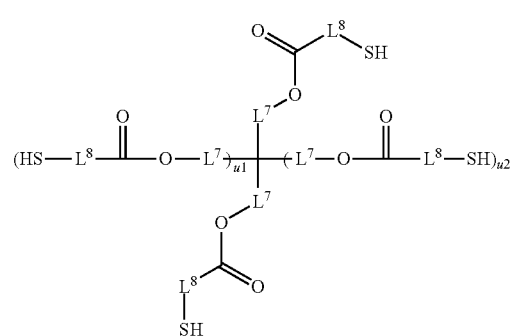

In Chemical Formula 5, $L^7$ and $L^8$ are independently a single bond, a substituted or unsubstituted C1 to C20 alkylene group, a substituted or unsubstituted C3 to C20 cycloalkylene group, a substituted or unsubstituted C6 to C20 arylene group, or a substituted or unsubstituted C2 to C20 heteroarylene group, and u1 and u2 are independently integers of 0 or 1.

For example, in Chemical Formula 4 and Chemical Formula 5, $L^7$ and $L^8$ may independently be a single bond or a substituted or unsubstituted C1 to C20 alkylene group.

Examples of the thiol-based additive may be selected from pentaerythritol tetrakis(3-mercaptopropionate) represented by Chemical Formula 4a, trimethylolpropane tris(3-mercaptopropionate) represented by Chemical Formula 4b, pentaerythritol tetrakis(mercaptoacetate) represented by Chemical Formula 4c, trimethylolpropane tris(2-mercaptoacetate) represented by Chemical Formula 4d, glycol di-3-mercaptopropionate represented by Chemical Formula 4e, and a combination thereof.

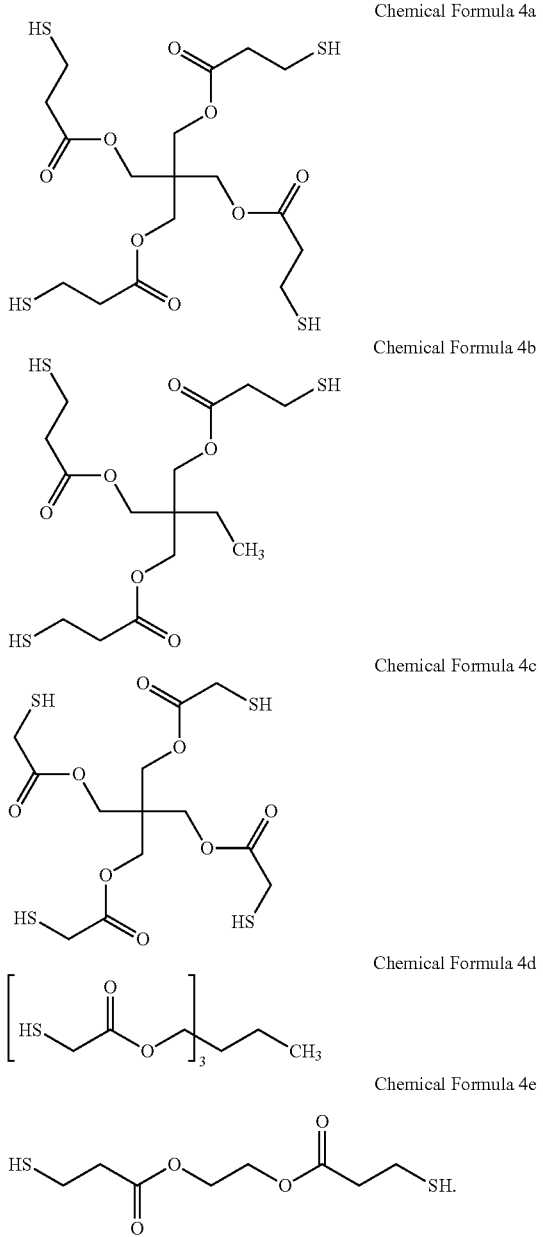

Chemical Formula 4a

Chemical Formula 4b

Chemical Formula 4c

Chemical Formula 4d

Chemical Formula 4e

The thiol-based additive may be included in an amount of about 0.1 wt % to about 10 wt %, for example about 0.1 wt % to about 5 wt % based on the total amount (weight) of the curable composition. For example, the thiol-based additive may be included in an amount of about 0.1 wt % to about 10 wt %, for example about 0.5 wt % to about 8 wt % based on a total solid amount (weight) of the curable composition. When the thiol-based additive is included within the foregoing ranges, stability of a photo-conversion material such as a quantum dot may be improved, the thiol group in the component reacts with an acrylic group of a resin or a monomer to form a covalent bond, and thereby heat resistance of a photo-conversion material such as a quantum dot may be improved.

The curable composition according to an embodiment may further include a polymerization inhibitor including a hydroquinone-based compound, a catechol-based compound, or a combination thereof. The curable composition according to an embodiment may inhibit or reduce crosslinking at room temperature during exposure after coating the photosensitive composition by further including the hydroquinone-based compound, the catechol-based compound, or the combination thereof.

For example, the hydroquinone-based compound, the catechol-based compound, or the combination thereof may be hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis (1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O, O')aluminum, or a combination thereof, but are not limited thereto.

The hydroquinone-based compound, catechol-based compound or combination thereof may be used in a form of dispersion, and the polymerization inhibitor in a form of the dispersion may be included in an amount of about 0.001 wt % to about 1 wt %, for example about 0.01 wt % to about 0.1 wt % based on the total amount (weight) of the curable composition. When the polymerization inhibitor is included within the foregoing ranges, passage of time at room temperature may be solved or reduced and concurrently (e.g., simultaneously), sensitivity deterioration and surface delamination phenomenon may be inhibited or reduced.

The curable composition according to an embodiment may further include malonic acid; 3-amino-1,2-propanediol; a silane-based coupling agent; a leveling agent; a fluorine-based surfactant; or a combination thereof in addition to the thiol-based additive and the polymerization inhibitor.

For example, the curable composition may further include a silane-based coupling agent having a reactive substituent such as a vinyl group, a carboxyl group, a methacryloxy group, an isocyanate group, an epoxy group and/or the like in order to improve close contacting properties with a substrate.

Examples of the silane-based coupling agent may be trimethoxysilyl benzoic acid, ymethacryl oxypropyl trimethoxysilane, vinyl triacetoxysilane, vinyl trimethoxysilane, yisocyanate propyl triethoxysilane, yglycidoxy propyl trimethoxysilane, β epoxycyclohexyl)ethyltrimethoxysilane, and the like, and these may be used alone or in a mixture of two or more.

The silane-based coupling agent may be used in an amount of about 0.01 parts by weight to about 10 parts by weight based on 100 parts by weight of the curable composition. When the silane-based coupling agent is included within the foregoing ranges, close contacting properties, storage capability, and/or the like are improved.

In addition, the curable composition may further include a surfactant, for example a fluorine-based surfactant as needed or desired in order to improve coating properties and inhibit or reduce generation of spots.

Examples of the fluorine-based surfactant may be, BM-1000®, and BM-1100® (BM Chemie Inc.); MEGAFACE F 142D®, F 172®, F 173®, and F 183® Dainippon Ink Kagaku Kogyo Co., Ltd.); FULORAD FC-135®, FULORAD FC-170C®, FULORAD FC-430®, and FULORAD FC-431® (Sumitomo 3M Co., Ltd.); SURFLON S-112®, SURFLON S-113®, SURFLON S-131®, SURFLON S-141®, and SURFLON S-145® (ASAHI Glass Co., Ltd.); and SH-28PA®, SH-190®, SH-193®, SZ-6032®, and SF-8428®, and the like (Toray Silicone Co., Ltd.); F-482, F-484, F-478, F-554 and the like of DIC Co., Ltd.

The fluorine-based surfactant may be included in an amount of about 0.001 parts by weight to about 5 parts by weight based on 100 parts by weight of the curable composition. When the fluorine-based surfactant is included within the range, coating uniformity may be ensured (e.g., substantially ensured), stains are not generated (or substantially not generated), and wetting properties for a glass substrate are improved.

The curable composition may further include other additives such as an antioxidant, a stabilizer, and/or the like in a set or predetermined amount as long as they do not reduce or adversely affect properties of the curable composition.

Another embodiment provides a resin layer manufactured by using the curable composition.

A method of manufacturing the resin layer includes coating the curable composition on a substrate using an inkjet spraying method to form a pattern (S1); and curing the pattern (S2).

(S1) Formation of Pattern

The curable composition may be coated to be about 0.5 μm to about 10 μm on a substrate utilizing an inkjet spraying method. The inkjet spraying method may form a pattern by spraying a single color, and thus, repeating the spraying as many times as the needed or desired number of colors, but the pattern may be formed by concurrently (e.g., simultaneously) spraying the needed or desired number of colors.

(S2) Curing

The obtained pattern is cured to obtain a cured resin layer. Herein, the curing may be thermal curing. The thermal curing may be performed by heating the pattern at a temperature greater than or equal to about 100° C. for 3 minutes to remove the solvent in the curable composition, and subsequently heating the same at a temperature of about 160° C. to about 300° C. for about 30 minutes.

Another embodiment provides a display device including the resin layer.

The display device may further include a color filter and a liquid crystal layer, and herein, the color filter may be disposed on one side of the liquid crystal layer, while the resin layer may be disposed on the other side of the liquid crystal layer.

In an embodiment of the display device, the color resist layer having the color filter is disposed with the liquid crystal layer in the middle to face the resin layer formed of a curable composition according to an embodiment by a column spacer. In addition, a silica deposition layer is present on one surface of the resin layer and absorbs blue light through a light guide from a light source. In the display device according to an embodiment of the present disclosure, a quantum dot-containing layer (a resin layer) is separately formed from the color resist layer and thus may prevent or reduce quantum efficiency deterioration of a quantum dot. In addition, the light guide may be not a PMMA light guide but a glass light guide. The glass light guide is used instead of the PMMA light guide and thus may contribute to making a panel thin and improving luminance.

For example, referring to the accompanying drawing, a color resist layer, including a blue colorresist 6, a green colorresist 7, and a red colorresist 8, is on a liquid crystal layer 3 that is on a resin layer 2 formed from a curable composition according to an embodiment of the present disclosure. Thus, the resin layer 2 is formed separately from the colorresist layer including the blue colorresist 6, the green colorresist 7, and the red colorresist 8, and thus, may prevent or reduce quantum efficiency deterioration of a quantum dot. In addition, a light guide 1 that absorbs blue light from a light source is on one surface of the resin layer 2. In addition, the light guide 1 may be not a PMMA light guide but a glass light guide. The glass light guide is used instead of the PMMA light guide, and thus, may contribute to making a panel thin and improving luminance. An overcoating layer 4 may be on the liquid crystal layer 3, and a substrate 5 (e.g., glass) may be on the overcoating layer 4.

Hereinafter, the present disclosure is illustrated in more detail with reference to examples. These examples, however, are not in any sense to be interpreted as limiting the scope of the present disclosure.

Preparation of Curable Composition

Examples 1 and 2 and Comparative Examples 1 and 2

Each curable composition according to Examples 1 and 2 and Comparative Examples 1 and 2 was prepared by using the following components in the following compositions shown in Table 1.

(A) Quantum Dot (A-1) InP/ZnSe/ZnS quantum dot (fluorescence $\lambda_{em}$=532 nm, FWHM=37 nm, Green QD, Hansol Chemical Co., Ltd.)

(A-2) InP/ZnSe/ZnS quantum dot (fluorescence $\lambda_{em}$=630 nm, FWHM=39 nm, Red QD, Hansol Chemical Co., Ltd.)

(B) Binder Resin (B-1) Binder resin (TAKOMA, TSR-TB04) including a structural unit represented by Chemical Formula E-1 and structural units represented by Chemical Formula E-2 at both terminal ends (a weight average molecular weight: 4,500 g/mol)

Chemical Formula E-1

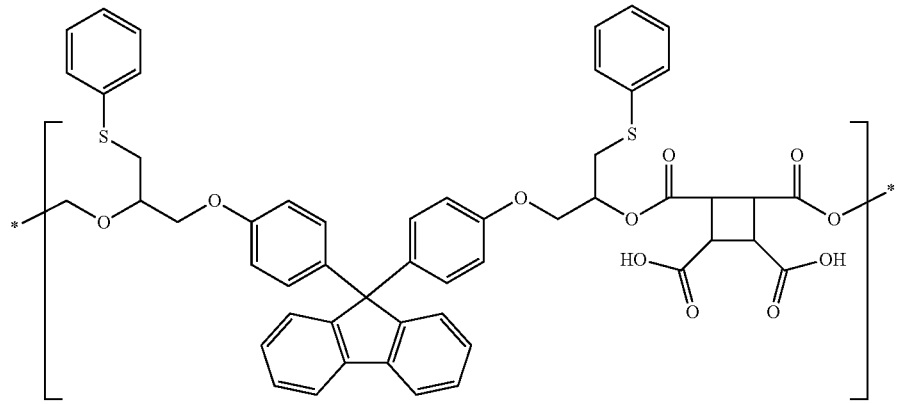

Chemical Formula E-2
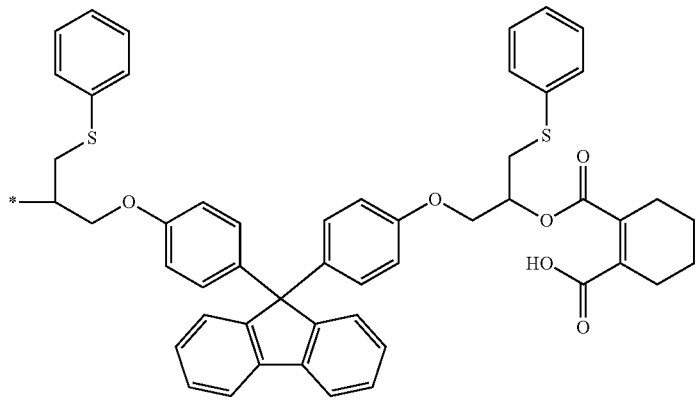
(B-2) Binder resin (TAKOMA, TSR-TA01) including the structural unit represented by Chemical Formula E-1, structural units represented by Chemical Formula E-3 and Chemical Formula E-4, and the structural units represented by Chemical Formula E-5 at both terminal ends (a weight average molecular weight: 4,000 g/mol)
Chemical Formula E-3
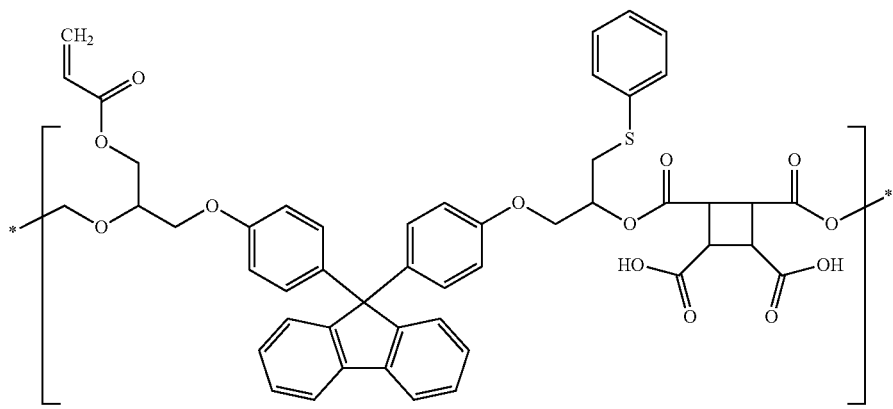
Chemical Formula E-4
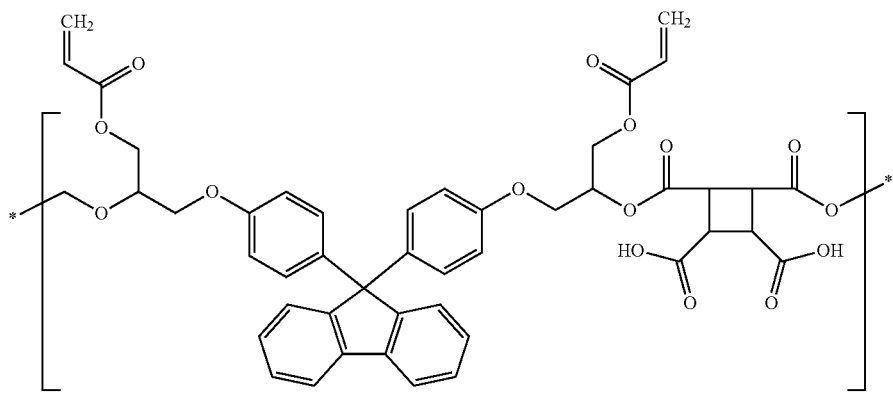

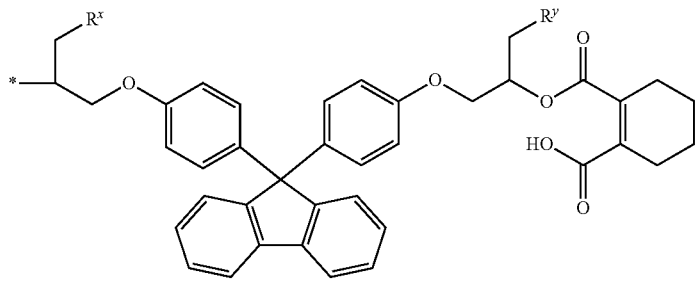

Chemical Formula E-5

In Chemical Formula E-5, $R^x$ and $R^y$ are independently *—O(C=O)CHCH$_2$ or an unsubstituted thiophenyl group.

(B-3) Binder resin (TAKOMA, TSR-TA01-2) including the structural units represented by Chemical Formula E-1, Chemical Formula E-3, and Chemical Formula E-4 and the structural units represented by Chemical Formula E-5 at both terminal ends (a weight average molecular weight: 8,000 g/mol)

(B-4) Acryl-based binder resin (SHOWA DENKO, SP-RY67-1)

(B-5) Acryl-based binder resin (SMS, 400H)

(B-6) Epoxy-based binder resin (ISA Co., Ltd., EHPE 3150)

(B-7) Epoxy-based binder resin (ISA Co., Ltd., OXT-221)

(C) Solvent (C-1) Cyclohexyl acetate (Sigma-Aldrich)

(C-2) Propylene glycol monomethylether acetate (PG-MEA) (Sigma-Aldrich)

(D) Reactive Unsaturated Compound

Acrylate-based monomer (V1000, Osaka Organic Chemical Industry Ltd.)

(E) Diffusion Agent

Titanium dioxide dispersion (TiO$_2$ solid content: 20 wt %, average particle diameter: 200 nm, Ditto Technology)

(F) Other Additives (F-1) Fluorine-based surfactant (F-554, DIC Co., Ltd.)

(F-2) Silane-based coupling agent (KBM803, Shin-Etsu Chemical Co., Ltd.)

TABLE 1

(unit: wt %)

|  |  | Example 1 | Example 2 | Comparative Example 1 | Comparative Example 2 |
|---|---|---|---|---|---|
| (A) quantum dot | A-1 | 1.11 | 1.11 | 1.11 | 1.11 |
|  | A-2 | 0.28 | 0.28 | 0.28 | 0.28 |
| (B) binder resin | B-1 | 4.56 | — | — | — |
|  | B-2 | 11.28 | — | — | — |
|  | B-3 | — | 11.28 | — | — |
|  | B-4 | — | — | 11.28 | — |
|  | B-5 | — | — | 4.56 | — |
|  | B-6 | — | — | — | 11.28 |
|  | B-7 | — | — | — | 4.56 |
| (C) solvent | C-1 | 5.28 | 5.28 | 5.28 | 5.28 |
|  | C-2 | 72.72 | 72.72 | 72.72 | 72.72 |
| (D) reactive unsaturated compound |  | 4.46 | 4.46 | 4.46 | 4.46 |
| (E) diffusion agent |  | 0.18 | 0.18 | 0.18 | 0.18 |
| (F) other additive | F-1 | 0.02 | 0.02 | 0.02 | 0.02 |
|  | F-2 | 0.11 | 0.11 | 0.11 | 0.11 |

Evaluation: Curing Shrinkage Rate and Luminance of Composition

Each curable composition according to Examples 1 and 2 and Comparative Examples 1 and 2 was taken by 15 ml and coated to be about 10 μm thick on a glass substrate with a spin coater (Opticoat MS-A150, Mikasa Corp.), prebaked on a hot-plate at 100° C. for 3 minutes, and subsequently post-baked (180° C., N$_2$, 30 minutes) in 2 steps (POB I, POB II), and then, its shrinkage rate was measured. In addition, its color coordinate and luminance were measured on 447 nm BLU by using a CAS spectrometer after POB I. The measurement results are shown in Table 2.

TABLE 2

|  | Example 1 | Example 2 | Comparative Example 1 | Comparative Example 2 |
|---|---|---|---|---|
| Shrinkage rate after POB I step (%) | 6.2 | 4.3 | 15 | 4.3 |
| Shrinkage rate after POB II step (%) | 0.6 | 0.3 | 3.2 | 0.2 |
| Luminance (%) | 102 | 103 | 85 | 64 |

As shown in Table 2, Examples 1 and 2 showed a low curing shrinkage rate and excellent luminance compared with Comparative Examples 1 and 2.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section.

Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the subject matter of the present disclosure has been described in connection with what is presently considered to be practical example embodiments, it is to be understood that the present disclosure is not limited to the disclosed embodiments, but, on the contrary, is intended to cover various modifications and equivalent arrangements included within the spirit and scope of the appended claims, and equivalents thereof. Therefore, the aforementioned embodiments should be understood to be exemplary but not limiting the present disclosure in any way.

DESCRIPTION OF SOME OF THE SYMBOLS 1 light guide
2 resin layer
3 liquid crystal layer
4 overcoating layer
5 glass
6 blue colorresist
7 green colorresist
8 red colorresist
9 green quantum dot
10 red quantum dot

What is claimed is:

1. A curable composition, comprising:
   (A) a quantum dot;
   (B) a binder resin comprising a structural unit represented by Chemical Formula 1-1, a structural unit represented by Chemical Formula 1-2, a structural unit represented by Chemical Formula 1-3, and a structural unit represented by Chemical Formula 2; and
   (C) a solvent:

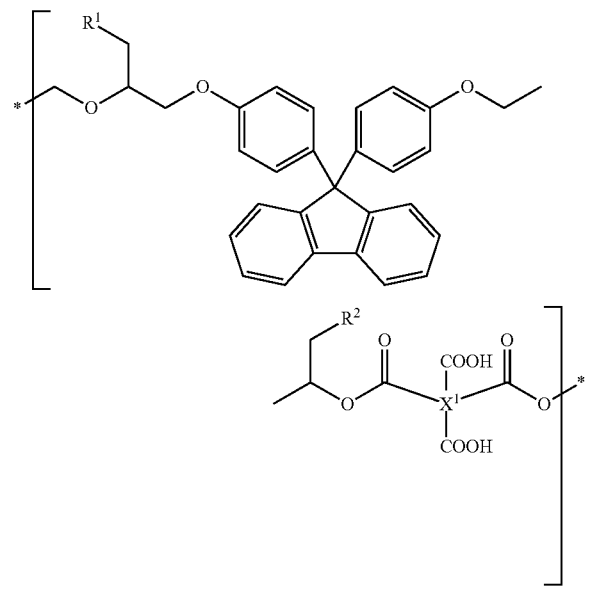

Chemical Formula 1-1

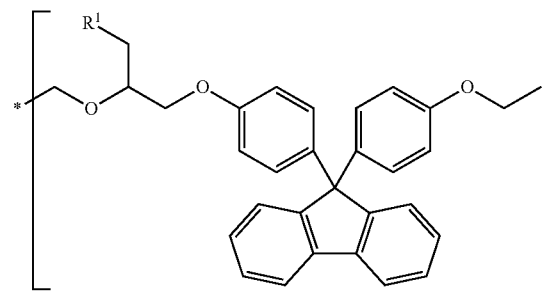

Chemical Formula 1-2

-continued

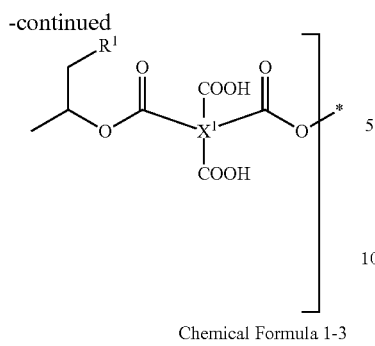

Chemical Formula 1-3

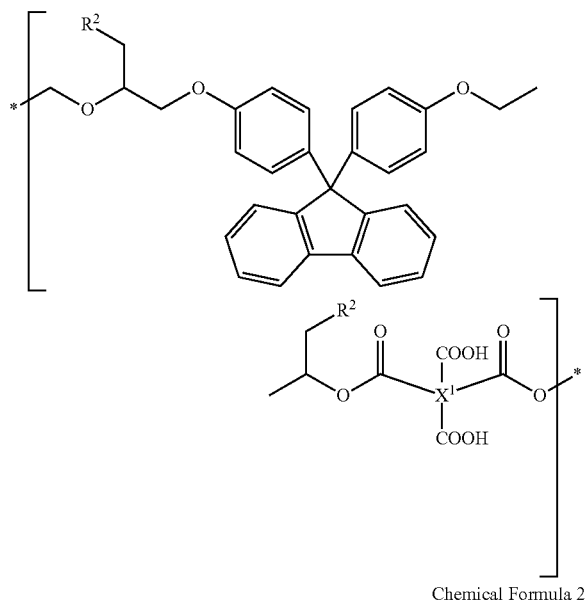

Chemical Formula 2

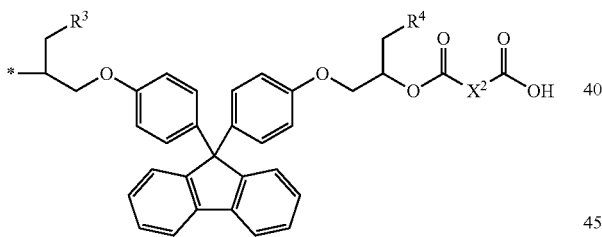

wherein:

in Chemical Formula 1-1 and Chemical Formula 1-2, $R^1$ is a substituted or unsubstituted acrylate group, in Chemical Formula 1-1 and Chemical Formula 1-3, $R^2$ is a substituted or unsubstituted C6 to C20 thioaryl group, in Chemical Formula 2, $R^3$ and $R^4$ are independently a substituted or unsubstituted acrylate group or a substituted or unsubstituted C6 to C20 thioaryl group, in Chemical Formula 1-1, Chemical Formula 1-2, and Chemical Formula 1-3, $X^1$ is a substituted or unsubstituted quadrivalent organic group, and in Chemical Formula 2, $X^2$ is a substituted or unsubstituted divalent organic group.

2. The curable composition of claim 1, wherein at least one of the acrylate groups $R^1$, $R^3$, or $R^4$ is represented by Chemical Formula 3:

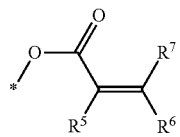

Chemical Formula 3 wherein, in Chemical Formula 3, $R^5$ to $R^7$ are independently a hydrogen atom or a substituted or unsubstituted C1 to C20 alkyl group.

3. The curable composition of claim 1, wherein the binder resin satisfies Equation 1:

$$0.1 \leq a/a+b \leq 0.5 \quad \text{Equation 1}$$

wherein, in Equation 1, a denotes the number of acrylate groups in the binder resin, and b denotes the number of thioaryl groups in the binder resin.

4. The curable composition of claim 1, wherein the curable composition further comprises another binder resin comprising a structural unit represented by Chemical Formula 1-3 and structural units represented by Chemical Formula 2 at both terminal ends:

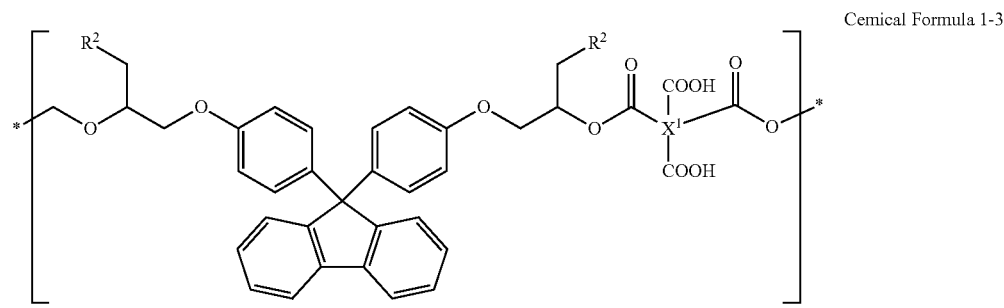

Cemical Formula 1-3

-continued

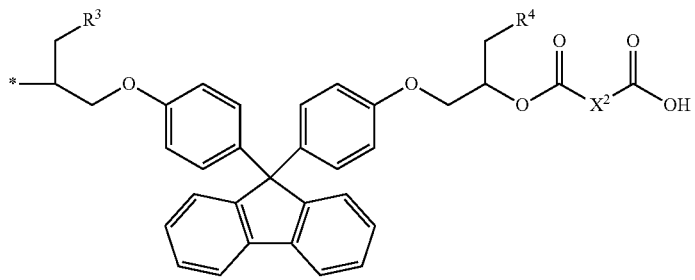

wherein:

in Chemical Formula 1-3 of the other binder resin, $R^2$ is a substituted or unsubstituted C6 to C20 thioaryl group, and $X^1$ is a substituted or unsubstituted quadrivalent organic group, and in Chemical Formula 2 of the other binder resin, $R^3$ and $R^4$ are independently a substituted or unsubstituted C6 to C20 thioaryl group, and $X^2$ is a substituted or unsubstituted divalent organic group.

5. The curable composition of claim 1, wherein $X^1$ is represented by one of Chemical Formula X-1 to Chemical Formula X-3:

Chemical Formula X-1

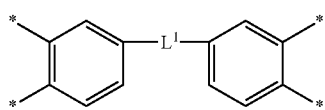

Chemical Formula X-2

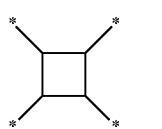

Chemical Formula X-3

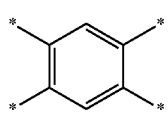

wherein, in Chemical Formula X-1, $L^1$ is a single bond, an oxygen atom, a sulfur atom, *—C(=O)—*, or *—$CR^{a1}R^{a2}$—*, and wherein $R^{a1}$ and $R^{a2}$ are independently a halogen-substituted or unsubstituted C1 to C10 alkyl group.

6. The curable composition of claim 1, wherein $X^2$ is represented by one of Chemical Formula X-4 to Chemical Formula X-10:

Chemical Formula X-4

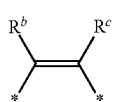

wherein, in Chemical Formula X-4, $R^b$ and $R^c$ are independently a hydrogen atom, a substituted or unsubstituted C1 to C20 alkyl group, an ester group or ether group, Chemical Formula 2

Chemical Formula X-5

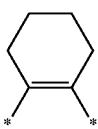

Chemical Formula X-6

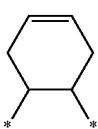

Chemical Formula X-7

Chemical Formula X-8

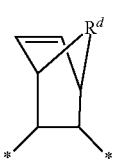

wherein, in Chemical Formula X-8, $R^d$ is O, S, NH, a substituted or unsubstituted C1 to C20 alkylene group, a C1 to C20 alkylamine group, or a C2 to C20 alkenylamine group, Chemical Formula X-9

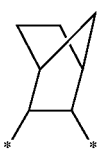

Chemical Formula X-10

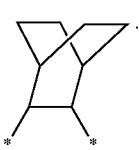

7. The curable composition of claim 1, wherein the binder resin has a weight average molecular weight of 2,000 g/mol to 12,000 g/mol.

8. The curable composition of claim 1, wherein the quantum dot absorbs light at a wavelength of 360 nm to 780 nm and emits fluorescence at a wavelength of 500 nm to 700 nm.

9. The curable composition of claim 1, wherein the quantum dot comprises a green quantum dot and a red quantum dot.

10. The curable composition of claim 1, wherein the solvent comprises propylene glycol monomethylether acetate, dipropylene glycol methylether acetate, cyclohexyl acetate, ethanol, ethylene glycoldimethylether, ethylene diglycolmethylethylether, diethylene glycoldimethylether, dimethyl acetamide, 2-butoxyethanol, N-methylpyrrolidine, N-ethylpyrrolidine, propylene carbonate, γ-butyrolactone, or a combination thereof.

11. The curable composition of claim 1, wherein the curable composition further comprises a reactive unsaturated compound.

12. The curable composition of claim 1, wherein the curable composition further comprises a diffusion agent.

13. The curable composition of claim 12, wherein the diffusion agent is included in an amount of 0.1 wt % to 20 wt % based on the total amount of the curable composition.

14. The curable composition of claim 12, wherein the diffusion agent comprises barium sulfate, calcium carbonate, titanium dioxide, zirconia, or a combination thereof.

15. The curable composition of claim 1, wherein the curable composition further comprises a thiol-based additive.

16. The curable composition of claim 15, wherein the thiol-based additive comprises at least two functional groups represented by Chemical Formula 4 at a terminal end:

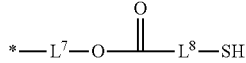

Chemical Formula 4 wherein, in Chemical Formula 4, $L^7$ and $L^8$ are independently a single bond, a substituted or unsubstituted C1 to C20 alkylene group, a substituted or unsubstituted C3 to C20 cycloalkylene group, a substituted or unsubstituted C6 to C20 arylene group, or a substituted or unsubstituted C2 to C20 heteroarylene group.

17. The curable composition of claim 1, wherein the curable composition comprises 1 wt % to 40 wt % of the quantum dot, 1 wt % to 40 wt % of the binder resin, and a balance amount of the solvent based on the total amount of the curable composition.

18. The curable composition of claim 1, wherein the curable composition further comprises malonic acid; 3-amino-1,2-propanediol; a silane-based coupling agent; a leveling agent; a fluorine-based surfactant; or a combination thereof.

19. A resin layer manufactured using the curable composition of claim 1.

20. A display device comprising the resin layer of claim 19.

21. The display device of claim 20, wherein:

the display device further comprises a color filter and a liquid crystal layer, the color filter is disposed at one side of the liquid crystal layer, and the resin layer is disposed at the other side of the liquid crystal layer.

* * * * *

UNITED STATES PATENT AND TRADEMARK OFFICE
CERTIFICATE OF CORRECTION

PATENT NO. : 10,876,046 B2  
APPLICATION NO. : 16/209782  
DATED : December 29, 2020  
INVENTOR(S) : Youn et al.

Page 1 of 1

It is certified that error appears in the above-identified patent and that said Letters Patent is hereby corrected as shown below:

In the Claims

Column 32, Line 17, Claim 2 delete "groups" and insert -- groups of --

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*